UNITED STATES PATENT OFFICE.

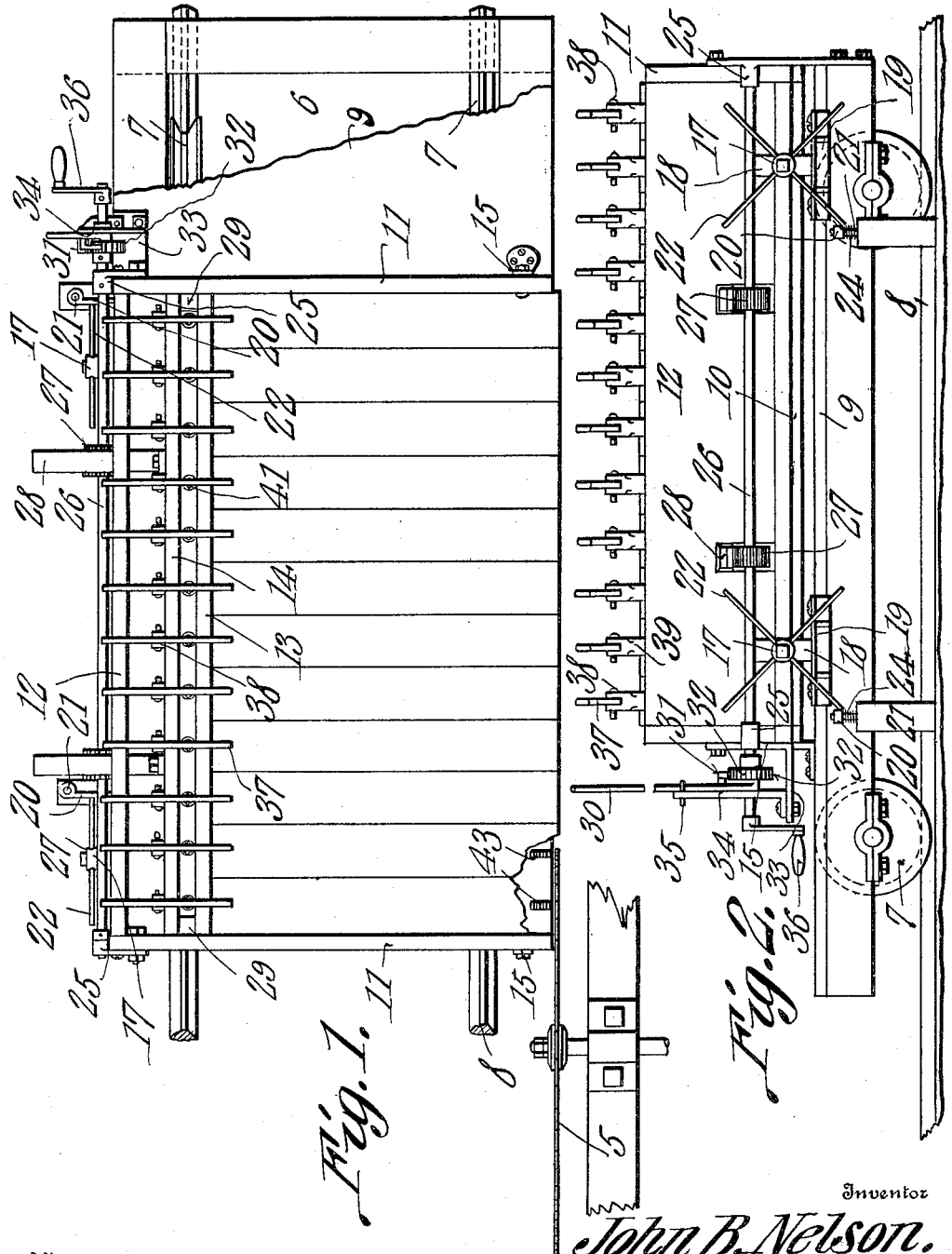

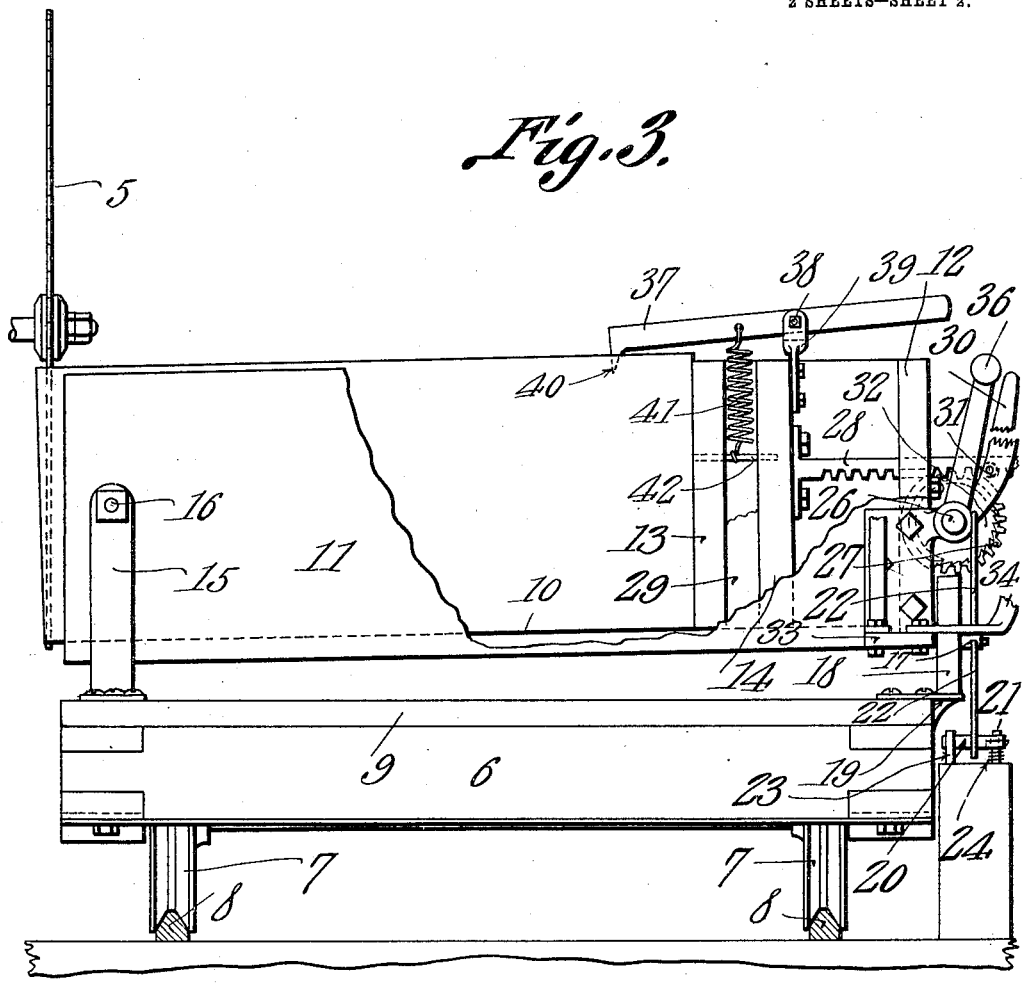

JOHN BRYAN NELSON, OF BIVINS, TEXAS.

SHINGLE-MACHINE.

1,036,308. Specification of Letters Patent. Patented Aug. 20, 1912.

Application filed February 24, 1910. Serial No. 545,577.

*To all whom it may concern:*

Be it known that I, JOHN B. NELSON, a citizen of the United States, residing at Bivins, in the county of Cass and State of Texas, have invented a new and useful Shingle-Machine, of which the following is a specification.

This invention relates to improvements in machines for sawing lumber into shingles, in which a log carriage is provided having a tilting support for the block to be sawed, so that the block may be presented to the saw at different angles to obtain the proper taper of the shingles.

It is the purpose of the present invention to provide in a machine of this kind, a novel construction and arrangement of parts to be hereinafter described and claimed, including improved means for automatically effecting the tilting movement of the log support at the end of the travel of the carriage, and for feeding the block toward the saw.

A further object of the invention is to provide a structure which is without complicated parts, and also to provide a mechanism for the purpose stated by which the adjustment of the block may be easily and quickly made.

In the accompanying drawings forming a part of this specification, Figure 1 is a plan view of a saw mill carriage showing the application of the invention, parts being broken away. Fig. 2 is a rear elevation. Fig. 3 is an enlarged end view, partly broken away.

In the drawings, the saw is indicated at 5, and the carriage at 6, the latter being mounted on wheels 7, traveling on rails 8. Any suitable mechanism may be provided for reciprocating the carriage.

On the top 9 of the carriage is mounted a table for supporting the blocks which are to be sawed into shingles. This table is pivotally mounted on an axis which is parallel to the plane of the saw, so that the shingle blocks may be presented to the saw at different angles, in order that the shingles may have a tapered form. The table comprises a platform 10, end walls 11, and a rear wall 12. A head block is also provided for feeding the shingle blocks to be sawed toward the saw. The head block comprises walls 13 and 14 which are spaced a short distance apart, and work between the end walls 11 across the platform 10, toward and from the saw. The mechanism for operating the head block will be presently described. The pivot of the table is near its front side, there being standards 15 mounted on the platform 9 of the carriage 6, near the top of which standards, the walls 11 are pivoted as indicated at 16. The end walls 11 and the rear wall 12 are rigidly mounted on the platform 10.

The following means are provided for tilting the table so that the shingle blocks to be sawed may be presented at different angles to the saw for the purpose already described: On the rear side of the platform 10, near the ends thereof, are mounted rotatable shafts 17, each of which carries a thrust member 18 resting on a shelf 19 secured to the carriage top 9. This member is so shaped that it will alternately elevate and lower the free end of the table when the shaft 17 is rotated, said member rotating with the shaft. As shown in the drawings, the thrust member is a block having a greater length than width, the shaft 17 extending through said block midway between its ends, so that when either end of the block is in engagement with the shelf 19, the free end of the table will be in elevated position, whereas, when the shaft is rotated to bring one of the sides of the block in contact with the shelf, the free end of the table will be lowered, the ends of the block being a greater distance from the shaft 17 than the sides.

For the purpose of automatically effecting the herein described tilting movement of the table, there is provided a trip device comprising a trigger 20 pivotally mounted on a post 21 to swing in a horizontal plane, the trigger being horizontally presented, and the post being so located that the trigger is in the path of cross-shaped radial arms 22 on the shaft 17. Each shaft is equipped in this manner, a trip device being provided with each shaft. The post 21 is located adjacent to one side of the track on which carriage 6 travels, so as to properly locate the trigger 20 with respect to the arm 22. Adjacent to the post 21 is located the post 23 against which the trigger 20 is adapted to swing, there being a spring 24 connected to the trigger to hold the free end of the trigger in engagement with the post 23. This arrangement permits the carriage 6 to travel in one direction without the shaft 17 being actuated, the trigger 20 swinging away from the post 23. When the carriage travels in the opposite direction, and one of the arms 22 strikes the trigger 20, the latter remains stationary, and through the arm 22 causes the shaft 17 to make a quarter turn. The arms 22 are so located with respect to the posts 21 and 23, that they pass between the same. The parts are so arranged that the table is tilted at the end of the return travel of the carriage, the trigger 20 swinging away from the post 23 to permit the arms 22 to pass without actuating the shaft 17. When the arms 22 clear the trigger 20, the spring 24 swings the trigger 20 back against the post 23. The herein described intermittent movement of the shaft 17 alternately brings the ends and the sides of the block 18 into contact with the shelf 19, and the table is tilted alternately on opposite sides of the horizontal, to vary the angle of the cut.

The following means are provided for operating the head block: On the end walls 11 of the table are mounted bearing brackets 25 supporting a shaft 26 which extends along the rear side of the table. On this shaft are pinions 27 which mesh with rack bars 28 passing loosely through openings in the wall 12, and fastened to the wall 14. The walls 13 and 14 of the head block are spaced by blocks 29, and are also connected so that they will move together. It will be obvious from the foregoing, that upon operating the shaft 26, the pinions 27, through the rack bars 28, will advance or retract the head block.

The shaft 26 is operated by means of a hand lever 30 loosely mounted on the shaft, and carrying a pawl 31 which is engageable with a ratchet 32 fast on the shaft. On one of the end walls 11 is also mounted a bracket 33 which supports a segment 34, the said segment having means for locking the shaft. Said locking means may be a pin 35 passing through the lever, and through one of a series of holes made in the segment. The hand lever 30 is provided for rotating the shaft 26 in a direction to advance the head block, and for retracting the head block, the shaft is fitted with a hand crank 36.

In operation, the shingle blocks to be sawed are advanced after each cut by reciprocating the hand lever 30. After the last cut has been taken, the head block is retracted by rotating the hand crank 36, and the table is then ready for another supply of shingle blocks. The head block also carries dogs for holding the shingle blocks on the table. Each of said dogs comprises an arm 37 pivoted intermediate its ends at 38 to a bracket 39 mounted on the wall 14. The arm is formed at one of its ends with a tooth 40 to bite into the shingle blocks, said tooth being forced into the block by means of a spring 41 fastened at one end to the arm, and at the other end to a cross rod 42 mounted between the walls 13 and 14 of the head block, the spring being so located as to draw the toothed end of the arm downwardly, and to cause the tooth to enter the shingle block.

At the front of the platform 10 are dogs 43 engageable with the bottom of the shingle blocks, to prevent the said blocks from slipping when the ends are reached.

The length of the saw table will be such that a number of shingle blocks may be placed thereon, a holding dog 37 being provided for each block. All the blocks abut at their rear ends against the head block, and they are therefore advanced simultaneously and uniformly when the shaft 26 is operated. The tilting of the saw table is effected automatically, and the amount of the tilting movement may be varied by providing the shaft 17 with different dimensioned blocks 18.

It is to be noted that the posts 21 are so disposed with respect to the carriage 6, that the posts serve to hold the carriage on the track, preventing displacement therefrom, when the carriage is reciprocating. Moreover, by reason of the fact that the shafts 17 protrude beyond the carriage and the track, the arms 22 being likewise located beyond the carriage and the track, the arms 22 may be adjusted readily for proper engagement with the triggers 20 without entering beneath the carriage, or disturbing the load which is supported upon the table. Moreover, should it be desired to elevate or lower the table manually, when the device is not in operation, the arms 22 may be seized, rotating the shafts 17, and adjusting the position of the thrust members 18 with respect to the carriage, this operation being consummated from the exterior of the structure, and without difficulty.

What is claimed is:

In a shingle sawing machine, a track; a carriage mounted for reciprocation upon the track; standards upon the carriage; a table pivotally connected, close to one end, with the standards, the table including a work-holding platform across which the shingle butt may be adjusted transversely of the carriage and toward and away from the shingle-saw, the platform being located below the pivotal support of the table, the table being adapted to move at right angles to the track; a shaft journaled in the table transversely of the track; a thrust member upon the shaft, and of unequal dimensions, the thrust member being arranged to engage the carriage to tilt the table; the shaft being provided upon its outer end, and beyond the track with radial arms; and means for engaging the arms successively to impart intermittent rotation to the shaft.

In testimony that I claim the foregoing as my own, I have hereto affixed my signature in the presence of two witnesses.

JOHN BRYAN NELSON.

Witnesses:
J. A. SELLERS,
W. H. PATE.

Copies of this patent may be obtained for five cents each, by addressing the "Commissioner of Patents, Washington, D. C."